United States Patent
Lou et al.

(10) Patent No.: US 7,542,243 B2
(45) Date of Patent: Jun. 2, 2009

(54) SLIDER WITH TRANSDUCING AND HEATING ELEMENTS FORMED ON TRAILING END THEREOF AND SHARING SAME THIN FILM STRUCTURE

(75) Inventors: Huazhou Lou, Eden Prairie, MN (US); Zine-Eddine Boutaghou, North Oaks, MN (US); Deborah S. Schnur, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 403 days.

(21) Appl. No.: 11/061,082

(22) Filed: Feb. 18, 2005

(65) Prior Publication Data

US 2006/0187583 A1  Aug. 24, 2006

(51) Int. Cl.
*G11B 5/56* (2006.01)
*G11B 5/60* (2006.01)
*G11B 5/31* (2006.01)

(52) U.S. Cl. ............... 360/294.7; 360/234.7; 360/236.5; 360/125.74

(58) Field of Classification Search ............. 360/234.7, 360/235.7, 236.5, 294.7, 128, 125.74, 125.75, 360/125.31, 235
See application file for complete search history.

(56) References Cited

U.S. PATENT DOCUMENTS

| | | | | |
|---|---|---|---|---|
| 4,317,149 A | * | 2/1982 | Elser et al. ............. | 360/123.37 |
| 5,072,324 A | * | 12/1991 | Lin et al. ............... | 360/123.17 |
| 5,111,348 A | | 5/1992 | Baba ....................... | 360/77.06 |
| 5,402,074 A | * | 3/1995 | Keel et al. ................ | 360/234.5 |
| 5,896,243 A | | 4/1999 | Koshikawa et al. ......... | 360/103 |
| 5,898,542 A | | 4/1999 | Koshikawa et al. ......... | 360/103 |
| 5,959,801 A | * | 9/1999 | Gillis et al. .............. | 360/294.7 |
| 5,991,113 A | | 11/1999 | Meyer et al. ................. | 360/75 |
| 6,466,409 B1 | | 10/2002 | Baba et al. ............... | 360/236.3 |
| 6,760,182 B2 | | 7/2004 | Bement et al. ................ | 360/75 |
| 7,400,473 B1 | * | 7/2008 | Krajnovich et al. ...... | 360/294.7 |
| 2002/0141113 A1 | * | 10/2002 | Kang et al. ............... | 360/236.5 |
| 2002/0176208 A1 | | 11/2002 | Serpe et al. .............. | 360/235.7 |
| 2002/0191326 A1 | * | 12/2002 | Xu et al. ....................... | 360/75 |
| 2003/0174430 A1 | * | 9/2003 | Takahashi et al. ............. | 360/75 |
| 2003/0235014 A1 | * | 12/2003 | Yamanaka et al. .......... | 360/317 |
| 2004/0027709 A1 | * | 2/2004 | Hamaguchi et al. ........... | 360/59 |
| 2004/0165311 A1 | * | 8/2004 | Yamanaka et al. .......... | 360/128 |
| 2004/0165312 A1 | * | 8/2004 | Koide et al. .................. | 360/128 |
| 2004/0179299 A1 | * | 9/2004 | Sasaki et al. ................. | 360/128 |
| 2004/0184192 A1 | * | 9/2004 | Ota et al. ..................... | 360/128 |
| 2004/0201920 A1 | * | 10/2004 | Koide et al. .................. | 360/128 |
| 2004/0257706 A1 | * | 12/2004 | Ota et al. .................. | 360/234.5 |

(Continued)

FOREIGN PATENT DOCUMENTS

JP        02139776 A  *  5/1990

(Continued)

*Primary Examiner*—Craig A Renner
(74) *Attorney, Agent, or Firm*—Leanne Taveggia Farrell; Westman, Champlin & Kelly, P.A.

(57) ABSTRACT

The present invention provides a transducing device. The transducing device includes a transducing element having a read element and a write element. The transducing device further includes at least one heating element formed within the transducing device and spaced apart from the heating element a sufficient distance to keep the at least one heating element from influencing a temperature of the transducing element.

16 Claims, 7 Drawing Sheets

U.S. PATENT DOCUMENTS

| | | | |
|---|---|---|---|
| 2004/0257707 A1* | 12/2004 | Thurn et al. | 360/234.7 |
| 2004/0259474 A1* | 12/2004 | Oyama et al. | 451/5 |
| 2005/0024775 A1* | 2/2005 | Kurita et al. | 360/234.3 |
| 2005/0030666 A1* | 2/2005 | Sasaki et al. | 360/128 |
| 2005/0041340 A1* | 2/2005 | Sasaki et al. | 360/128 |
| 2005/0047016 A1* | 3/2005 | Koide et al. | 360/234.5 |
| 2005/0094316 A1* | 5/2005 | Shiramatsu et al. | 360/128 |
| 2005/0213250 A1* | 9/2005 | Kurita et al. | 360/234.4 |

FOREIGN PATENT DOCUMENTS

JP      03252975 A  * 11/1991

* cited by examiner

SLIDER WITH TRANSDUCING AND HEATING ELEMENTS FORMED ON TRAILING END THEREOF AND SHARING SAME THIN FILM STRUCTURE

FIELD OF THE INVENTION

The present invention relates generally to data storage systems. In particular, but not by limitation, the present invention relates to transducing devices in data storage systems.

BACKGROUND OF THE INVENTION

A typical disc drive includes a rigid housing that encloses a variety of disc drive components. The components include one or more rotating discs having data surfaces that are coated with a medium for storage of digital information in a plurality of circular, concentric data tracks. The discs are mounted on a spindle motor that causes the discs to spin. Sliders carry transducers, which write information to and read information from the data surfaces of the discs. The slider and transducers are often together referred to as the "head."

A slider includes a slider body having a leading edge, a trailing edge and an air bearing surface (ABS) which faces the disc surface. As the disc rotates, the disc drags air under the slider along the air bearing surface, which creates a hydrodynamic lifting force that causes the slider to lift and fly above the disc surface. The transducer is typically mounted at or near the trailing edge of the slider.

Typically, the transducer includes an inductive recording and/or write element for generating a magnetic field that aligns the magnetic moments of the data surfaces to represent desired bits of data. The write element includes a magnetic core to record magnetic transitions to the magnetized medium surface of a disc. The core is magnetically coupled to a conductive coil. Electrical current flows through the conductive coil during a write operation and generates magnetic flux in the core to record transitions in the magnetic surface coating of the rotating disc or other medium. The magnetic core includes a pair of poles, wherein each pole has a corresponding pole tip adjacent a surface opposing the storage medium. The pole tips tend to protrude when write current is flowing through the conductive coil and, thus, decreases the head-to-medium spacing. Typically, the transducer also includes a read element that is adapted to read magnetic flux transitions recorded to data tracks on the medium, which represent the bits of data.

As the areal density of media increases, the passive head-to-medium spacing is decreasing. At some point, this ever-increasing areal density of the media will cause the head to undesirably come into contact with the medium.

More recently, a writer heater has been placed in the write element of the transducer to generate active control of pole tip protrusion regardless of whether the write current is passing through the conductive coil. As a result, the pole tips protrude and push the write element closer to the surface of the medium, which when thermally stabilized, results in a more efficient write process. However, the protrusion generated by the writer heater causes the slider to push back from the medium and results in a smaller net head-to-medium spacing than desired. In addition, the writer heater transfers a significant amount of heat to the reader element. As the reader element temperature increases, the reader element becomes less reliable.

Embodiments of the present invention provide solutions to these and other problems, and offer other advantages over the prior art.

SUMMARY OF THE INVENTION

The present invention provides a transducing device. The transducing device includes a transducing element. The transducing device further includes at least one heating element formed in the transducing device and spaced a sufficient distance from the transducing element to substantially reduce a temperature effect on the transducing element.

The present invention further provides a transducing device that includes a transducing element and at least one heating element formed with the transducing device. The transducing device also includes first external surface configured to generate a first lift and a second external surface. The second external surface located proximal to the least one heating element such that when the at least one heating element is energized the second external surface generates a second lift.

The present invention still further provides a transducing device that includes a thin film structure deposited in layers on a substrate and a transducing element formed in one of the layers of the thin film structure. The transducing element also includes at least one heating element formed in the thin film structure and spaced apart from the transducing element. The at least one heating element is located proximate an external surface.

Other features and benefits that characterize embodiments of the present invention will be apparent upon reading the following detailed description and review of the associated drawings.

DETAILED DESCRIPTION OF ILLUSTRATIVE EMBODIMENTS

Embodiments of the present invention provide a heating element in a transducing device. The heating element is located a sufficient distance from the transducing element, such that the heat from the heating element does not effect the reliability of the transducing element. With the advent of storage media having high areal densities, the pole tips of a transducing element can come in contact with a storage medium. To avoid head-to-medium contact in high areal density media, the heating element is energized to push the slider back to prevent head-to-medium contact. As used herein, the heating element does not correspond with any portion of the transducing element. In particular, the heating element does not correspond with the pole tips of the transducing element.

Figure 1:
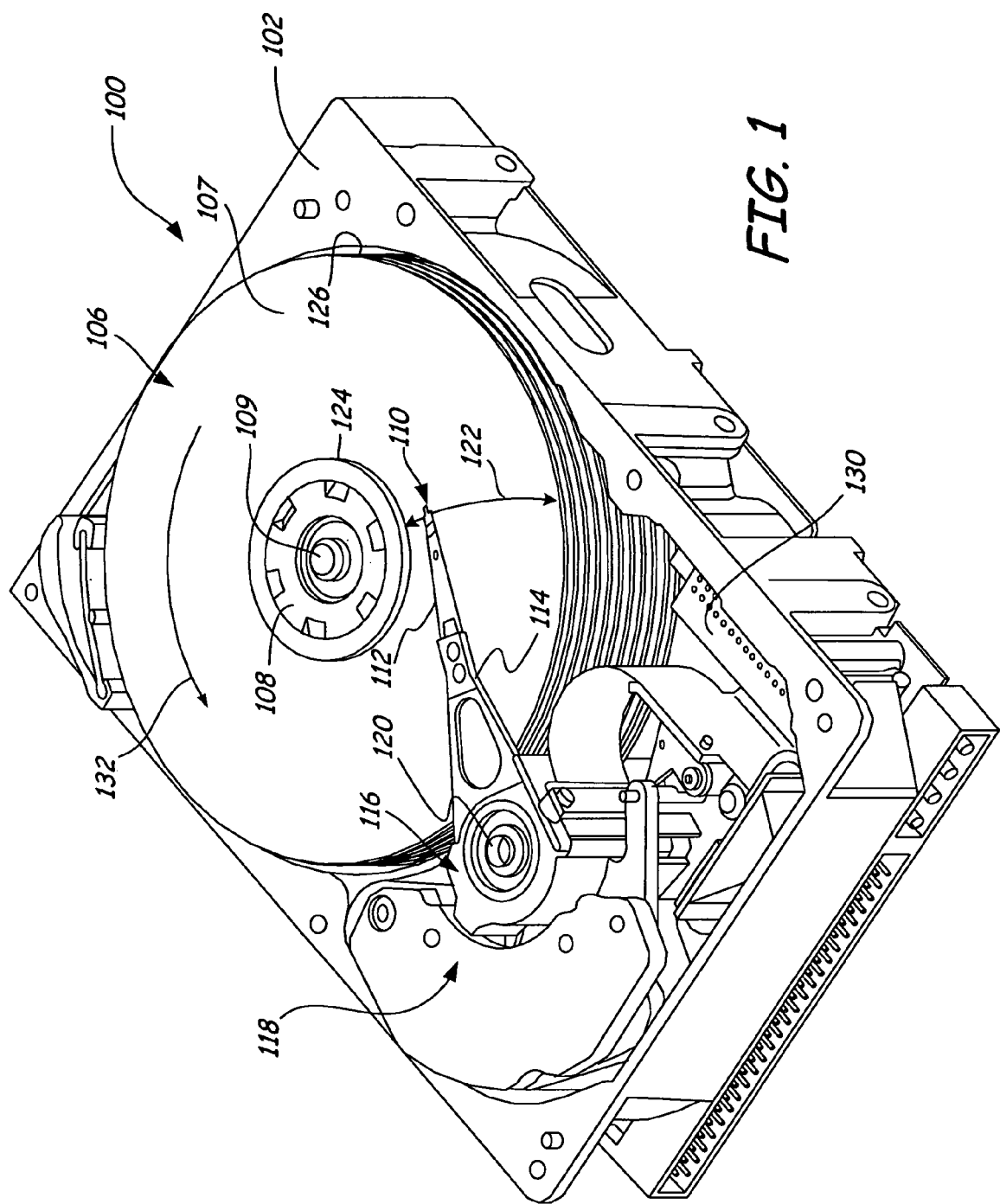
FIG. 1 is perspective view of a storage system.

FIG. 1 is a perspective view of storage system 100 that includes a housing with base deck 102 and top cover (not shown) in which embodiments of the present invention are useful. Although FIG. 1 illustrates a storage system, it should be noted that the present invention can be used in other systems that contain transducing devices.

Storage system 100 further includes storage media or a disc pack 106, which is mounted on a spindle motor (not shown) by a disc clamp 108. Disc pack 106 can include one or more discs and is illustrated with a plurality of individual discs 107, which are mounted for co-rotation about axis 109 in the direction indicated by arrow 132. Each disc surface has an associated transducing device or slider 110 that carries transducing elements, such as read/write transducers, for communication with a disc surface. In the example in FIG. 1, slider 110 is supported by suspension 112 that is in turn attached to track accessing arm 114 of an actuator mechanism 116. Actuator mechanism 116 is of the type known as a rotating moving coil actuator and includes a voice coil motor (VCM), shown generally at 118. VCM 118 rotates actuator mechanism 116 about pivot shaft 120 to position slider 110 over a desired data track along an arcuate path 122 between a disc inner diameter 124 and a disc outer diameter 126. Slider 110 is coupled to suspension 112 through a gimbal attachment which allows slider 110 to pitch and roll as it rides on an air-bearing surface (ABS) of disc 107. Slider 110 supports the transducers at a trailing edge. The transducers include separate reading and writing elements for reading data from, and recording data to disc 107.

During operation, as disc 107 rotates, air is dragged under the ABS of slider 110 in a direction approximately parallel to the tangential velocity of disc 107. As the air passes beneath the bearing surfaces, air compression along the air flow path causes the air pressure between the disc surface and the bearing surfaces to increase, which creates a hydrodynamic lifting force that counteracts a load force provided by suspension 112. This hydrodynamic lifting force causes the slider 110 to "fly" above, and in close proximity, to the disc surface of disc 107.

VCM 118 is driven by electronic circuitry 130 based on signals generated by the transducers and a host computer (not shown). During operation, electronic circuitry 130 receives position information indicating a portion of disc 107 to be accessed. Electronic circuitry 130 receives the position information from an operator, from a host computer, or from another suitable controller. Based on the position information, electronic circuitry 130 provides a position signal to actuator mechanism 116. Once the transducers are appropriately positioned over a specified track on disc 107, electronic circuitry 130 then executes a desired read or write operation.

Figure 2:
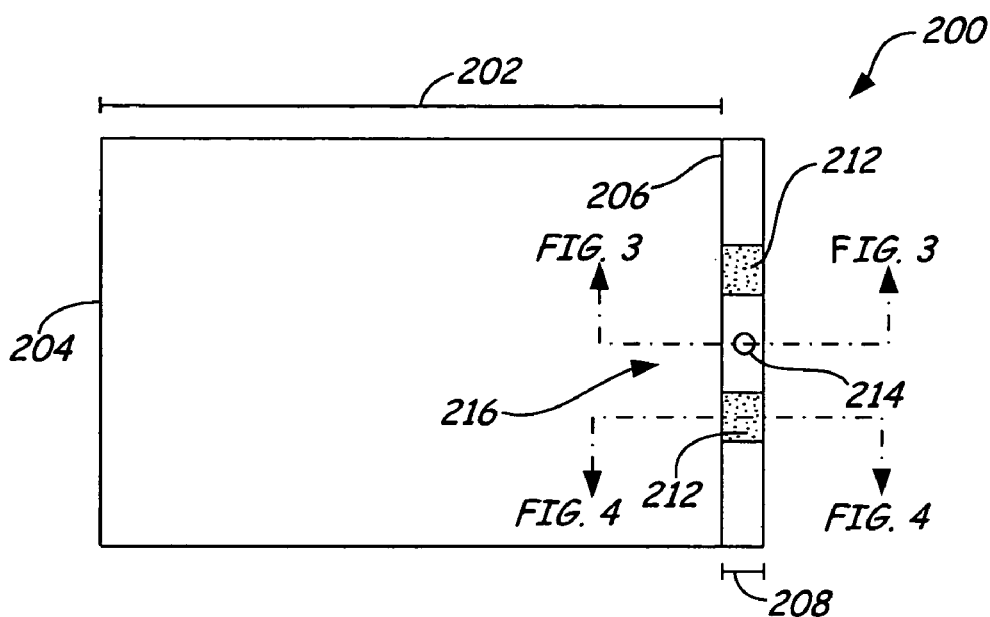
FIG. 2 is a bottom view of a transducing device in accordance with an embodiment of the present invention.

FIG. 2 illustrates a bottom view of a transducing device or slider 200 in accordance with an embodiment of the present invention. Slider 200 includes a slider substrate 202 and a thin film structure 208. The slider substrate 202 has a leading edge 204 and a trailing edge 206. Typically, slider substrate 202 is made of a mixture of Aluminum Oxide or Alumina ($Al_2O_3$) and titanium carbide (TiC), referred to in this application as "AlTiC". However, similar materials, other than AlTiC, can be used. Although FIG. 2 illustrates transducing element 214 as being formed in the thin film structure 208, it should be noted that transducing element 214 can be formed in other portions of the transducing device or slider 200.

Figure 3:
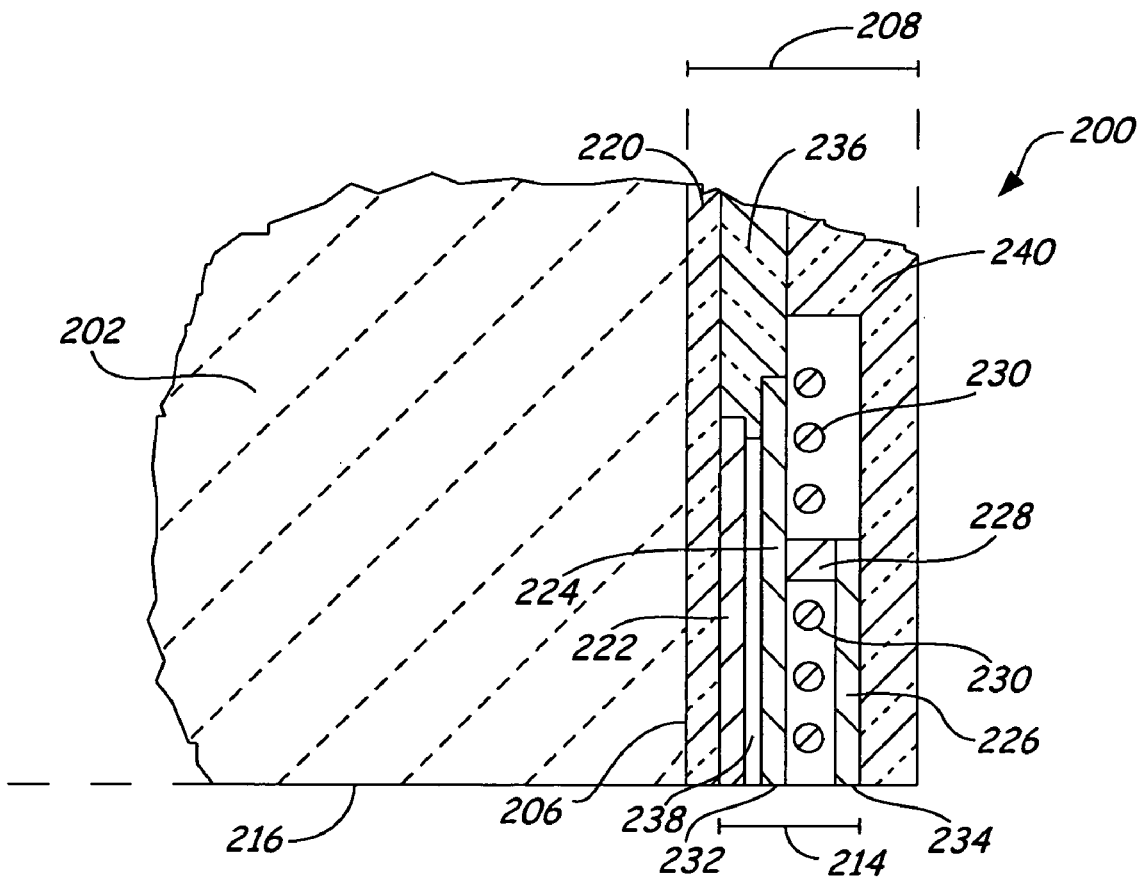
FIG. 3 is a partial sectional view of a portion of the transducing device illustrated in FIG. 2 in accordance with an embodiment of the present invention.

FIG. 3 is a partial sectional view of a portion of the transducing device or slider 200 as illustrated in FIG. 2 in accordance with an embodiment of the present invention. FIG. 3 illustrates portions of the slider substrate 202, the thin film structure 208, and the transducing element 214.

To form thin film structure 208 in accordance with the embodiment illustrated in FIG. 2, first, a base coat 220 is deposited on trailing edge 206 of substrate 202. Base coat 220 is an electrically insulating material, typically made of $Al_2O_3$. Base coat 220 forms a bond to substrate 202. Next, transducing element 214 is deposited in layers on base coat 220 to form a write element and a read element. The deposited layers include lower shield 222, shared pole 224, top pole 226, and back via 228. Back via 228 completes a write magnetic circuit through the center of a conductive coil 230 and through pole tips 232 and 234. During writing, conductive coil 230 is energized and induces a magnetic flux. The energized coil 230 causes shared pole 224, top pole 226, and back via 228 to thermally expand, such that pole tips 232 and 234 protrude towards a storage medium resulting in an efficient write process. Although pole-tip protrusion increases the efficiency of a write process, the advent of high areal density storage media has resulted in the slider 200 flying closer to the storage medium. Consequently, the pole-tips can undesirably come into contact with the storage medium.

Typically, an insulating layer 236 fills the space around lower shield 222 and shared pole 224. Like base coat 220, insulating layer 236 is generally made of $Al_2O_3$. A read sensor 238 is formed in a thin layer between lower shield 222 and shared pole 224. Read sensor 238 is typically a magnetoresistive (MR) or giant magnetoresistive (GMR) sensor.

Finally, an overcoat layer 240 is deposited on top of transducing element 214. Typically, overcoat layer 240 is also made of $Al_2O_3$. After slider 200 is formed, it is lapped and ion milled to shape external surfaces or air bearing surfaces, such as first external surface 216 of slider 200. During the process of lapping, first external surface 216, substrate 202, and layers 220, 222, 224, 226, 238, and 240 are eroded at different rates due to their different mechanical and chemical properties. For example, layers 220 and 240, typically made of $Al_2O_3$, are eroded more than substrate 202. Even though not illustrated in FIG. 3, layers 220 and 240 are recessed with respect to the lapped main air bearing surface 216 of substrate 202. Metallic magnetic layers 222, 224, and 226, forming transducing element 214, are also recessed with respect to substrate 202. The recess, however, is typically smaller than that of layers 220 and 240.

Referring back to FIG. 2, slider 200 also includes external surfaces or air bearing surfaces. These external surfaces allow slider 200 to lift and "fly" above a medium. For example, first external surface or main air bearing surface 216 is located along the bottom side of slider substrate 202. First external surface 216 generates a lift such that slider 200 flies over the medium or communicates with the medium at a distance. In addition, slider 200 can include second external surfaces or compensating air bearing surfaces 212. Although FIG. 2 illustrates two second external surfaces 212, it should be noted that slider 200 can include any number of second external surfaces, including a single second external surface.

Figure 4:
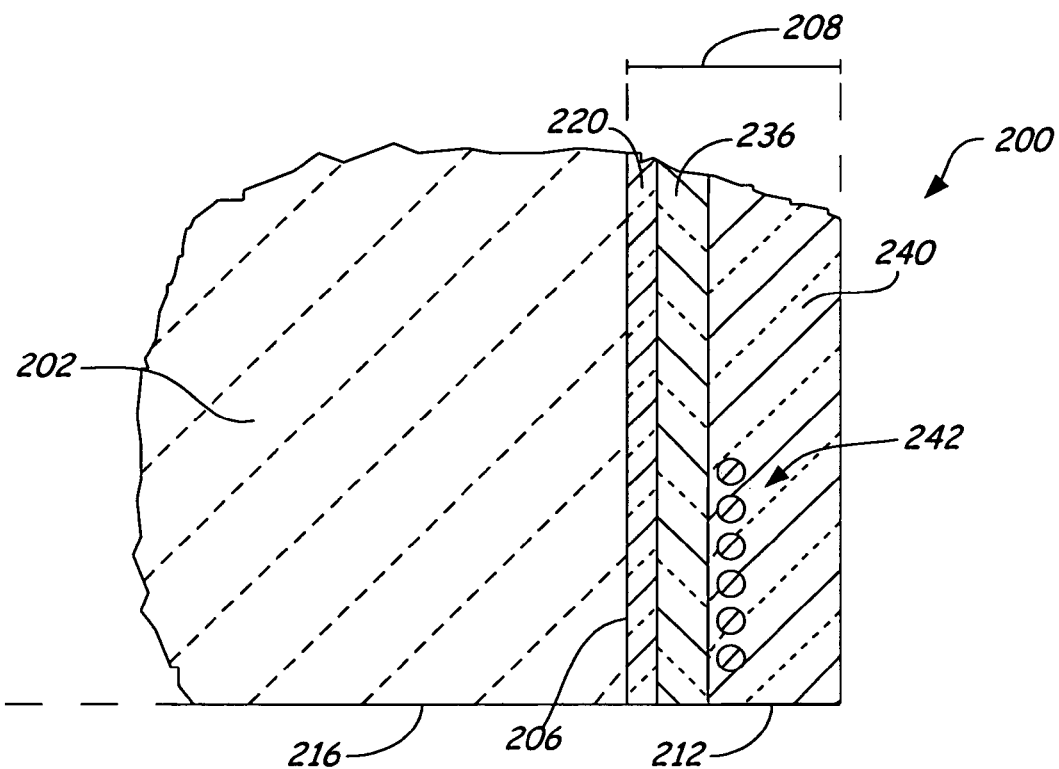
FIG. 4 is a partial sectional view of a portion of the transducing device illustrated in FIG. 2 in accordance with an embodiment of the present invention.

FIG. 4 is a partial sectional view of a portion of transducing device or slider 200 illustrated in FIG. 2 in accordance with an embodiment of the present invention. FIG. 4 illustrates substrate 202, thin film structure 208, and second external surface 212. Second external surface 212 alters the lift (or lifting force) generated by first external surface 216 or alters the distance at which transducing element 214 (FIG. 3) communicates with the medium. Thus, reducing the chance that pole tips 232 and 234 (FIG. 3) come into contact with the medium.

A heating element 242 is positioned proximate second external surface 212 and formed within the thin film structure 208. In particular, the heating element 242 is substantially simultaneously formed in a layer of the thin film structure with the transducing device 214. It should be noted that heating element 242 is not limited to being formed in thin film structure 208. Heating element 242 can be formed in other portions of slider 200. Since heating element 242 is formed substantially simultaneously with transducing element 214 in the embodiment illustrated in FIG. 4, heating element 242 is deposited substantially parallel with trailing edge 206 and spaced apart from the transducing element along the trailing edge. More than one heating element 242 can be deposited substantially simultaneously with and spaced apart from transducing element 214.

Figure 5:
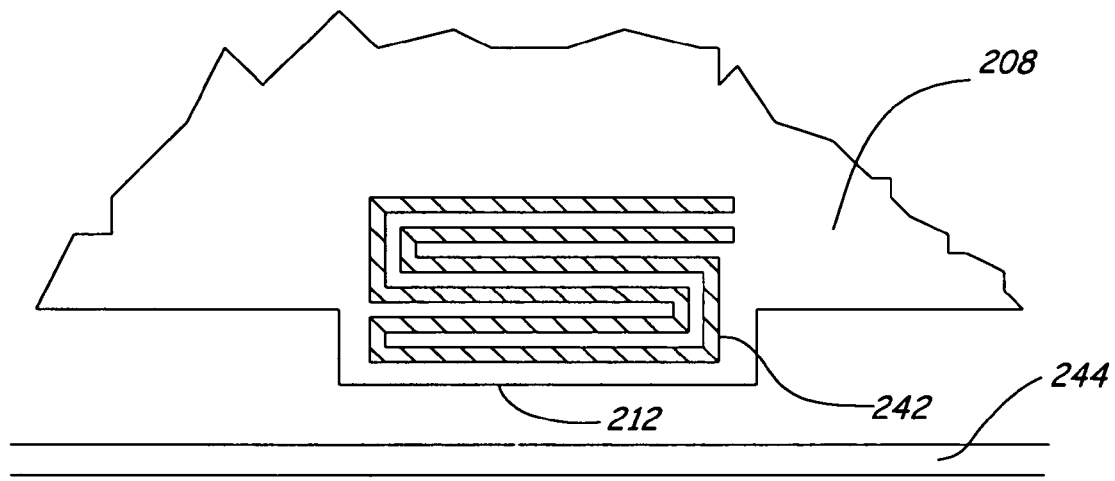
FIG. 5 is an enlarged trailing edge end view of the heating element illustrated in FIG. 4 in accordance with an embodiment of the present invention.

FIG. 5 illustrates an enlarged trailing edge end view of the heating element 242 illustrated in FIG. 4 in accordance with an embodiment of the present invention. As illustrated in the embodiment of FIG. 5, heating element 242 is formed within thin film structure 208 and can be made of a conductive coil. Upon passing a current through heating element 242, heating element 242 is energized and its temperature increases. As the temperature in heating element 242 increases, the material (second external surface 212) proximate the heating element 242 thermally expands causing second external surface 212 to protrude towards storage medium 244. The acts of heating and protruding ultimately cause air pressure on second external surface 212 to push slider 200 away from storage medium 244 to control the fly height. Therefore, the amount of energy that is used to energize heating element 242 correlates to the amount of heat the heating element produces. A higher heat output pushes slider 200 farther away from storage medium 244 than a lower heat output. By varying the heat output, the fly height of slider 200 can be controlled such that the chances that pole tips 232 and 234 of transducing element 214 (shown in FIG. 3) contact the medium 244 are reduced.

Figure 6:
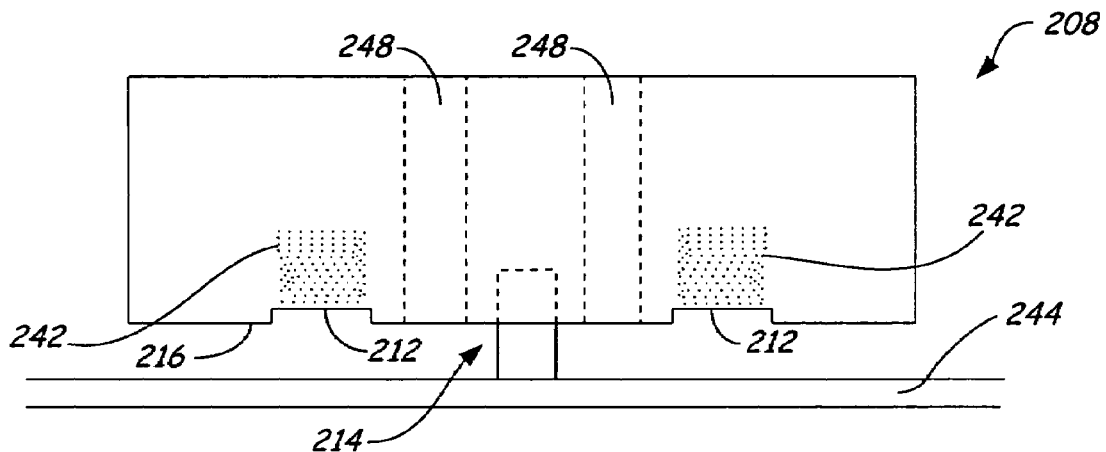
FIG. 6 is a trailing edge end view of the transducing device illustrated in FIG. 2 in accordance with an embodiment of the present invention.
Figure 7:
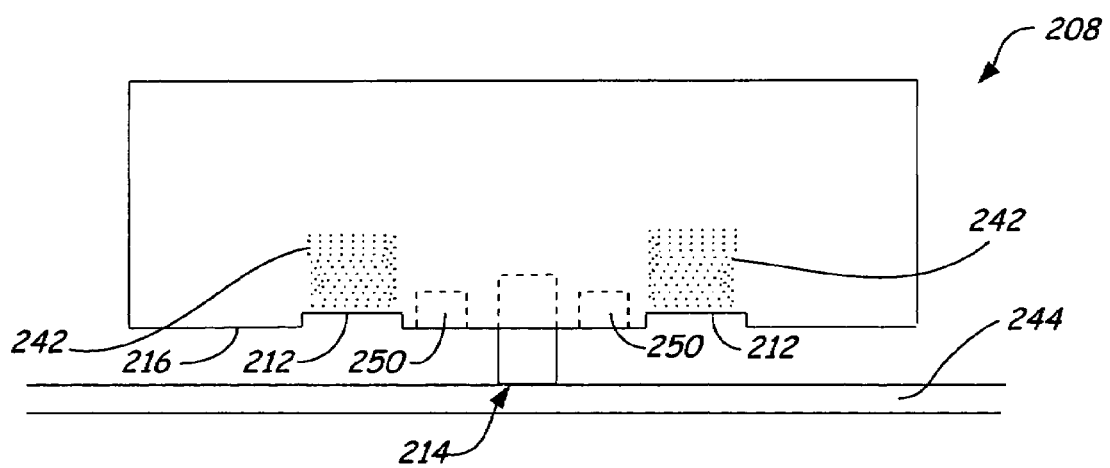
FIG. 7 is a trailing edge end view of the transducing device illustrated in FIG. 2 in accordance with an embodiment of the present invention.

FIGS. 6 and 7 illustrate a trailing edge end view of the transducing device or slider 200 illustrated in FIG. 2 in accordance with an embodiment of the present invention. In FIGS. 6 and 7, heating elements 242 are not energized and do not alter the distance at which transducing element 214 communicates with medium 244 (FIG. 4). Without energizing heating elements 242, the pole tips of transducing element 214 can come into contact with medium 244, which has a high areal density. Thus, the distance at which transducing element 214 communicates with medium 244 is zero. FIGS. 6 and 7 illustrate such an event.

Second external surfaces 212 are formed in thin film structure 208 proximate to and covering heating elements 242. When heating elements 242 are not energized, second external surfaces 212 are slightly recessed from first external surface 216. A recessed second external surface can be formed by energizing heating elements 242 during the lapping process or by burnishing during flying.

In an embodiment and as illustrated in FIG. 6, heating elements 242 are spaced apart from transducing element 214 by a distance sufficient to keep heating elements 242 from effecting the temperature of read sensor 238 (FIG. 3). For example, heating element 242 can be spaced apart from transducing element 214 by a distance greater than 5 microns. For example, the distance between heating element 242 and transducing element 214 can be between about 10 microns and about 20 microns. In the embodiment illustrated in FIG. 6, the distance heating elements 242 are spaced apart from transducing element 214 can be reduced if thin film structure 208 includes insulating materials 248 for thermally insulating the transducing element 214 from the heating element 242. Insulating materials 248 are positioned between heating elements 242 and transducing element 214. Insulating materials 248 can be made of alumina ($Al_2O_3$) or other materials that demonstrate insulating properties.

In the embodiment illustrated in FIG. 7, the distance heating elements 242 are spaced apart from transducing element 214 can also be reduced if trenches 250 are formed in thin film structure 208 between the heating elements and transducing element 214. For example, trenches 250 can have a depth that sufficiently insulates heating elements 242 from magnetic transducer 214 both thermally and mechanically. The depth of trenches 250 can be greater than 2 microns. For example, the depth of trenches 250 can be between about 3 microns and about 10 microns.

Figure 8:
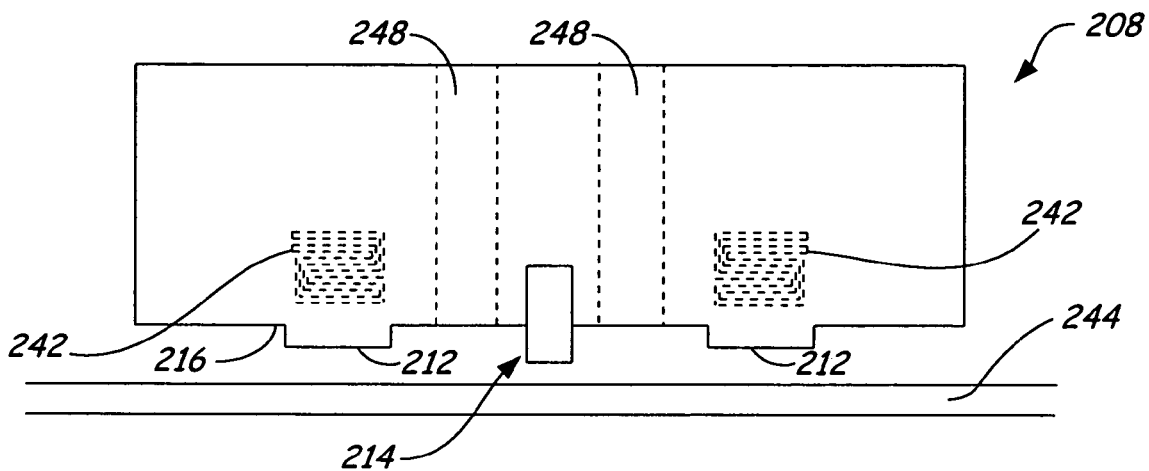
FIG. 8 is a trailing edge end view of the transducing device illustrated in FIG. 2 in accordance with an embodiment of the present invention.

FIG. 8 illustrates a trailing edge end view of the transducing device or slider 200 illustrated in FIG. 2 in accordance with an embodiment of the present invention. In FIG. 8, heating elements 242 are energized. When heating elements 242 are energized, second external surfaces 212 protrude towards storage medium 244 and alter the lift generated by first external surface 216 (FIG. 2) or alter the distance at which transducing element 214 communicates with medium 244. Pole tips of transducing element 214 are pushed back from storage medium 244 and therefore avoid head-to-medium contact.

Figure 9:
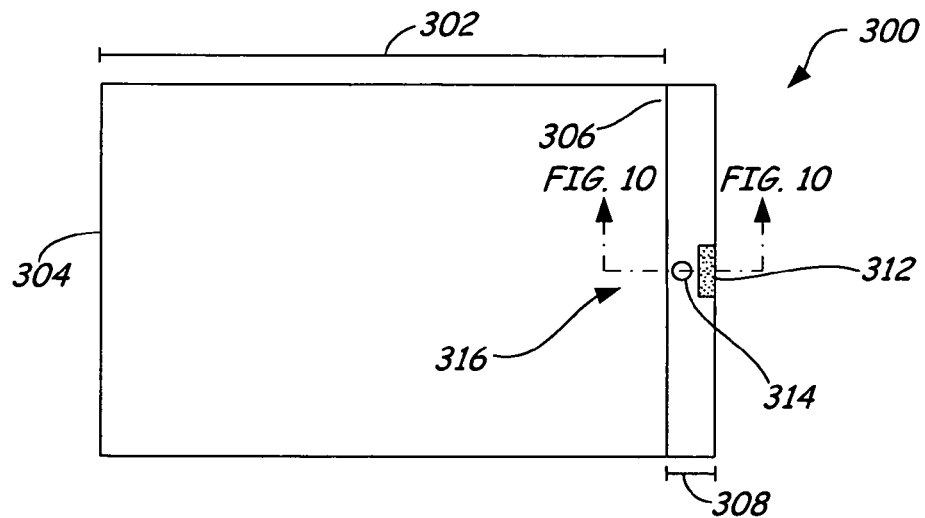
FIG. 9 is a bottom view of a transducing device in accordance with an embodiment of the present invention.

FIG. 9 illustrates a bottom view of a transducing device or slider 300 in accordance with an embodiment of the present invention. Slider 300 includes a slider substrate 302 and thin film structure 308. The slider substrate 302 has a leading edge 304 and a trailing edge 306. Slider 300 includes a transducing element 314 formed in thin film structure 308.

Figure 10:
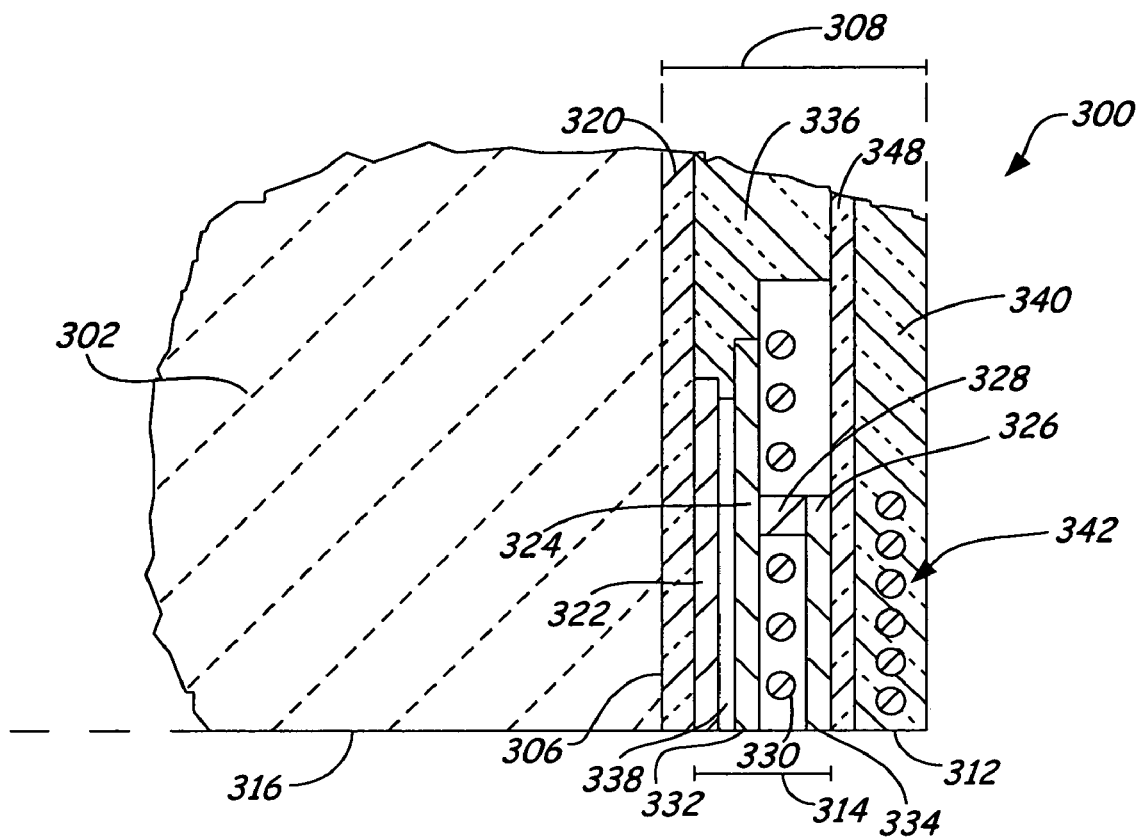
FIG. 10 is a partial sectional view of a portion of the transducing device illustrated in FIG. 9 in accordance with an embodiment of the present invention.

FIG. 10 is a partial sectional view of a portion of the transducing device or slider 300 illustrated in FIG. 9 in accordance with an embodiment of the present invention. FIG. 10 illustrates portions of slider substrate 302, thin film structure 308, transducing element 314, and second external surface 312.

To form thin film structure 308 in accordance with the embodiment illustrated in FIG. 9, first, base coat 320 is deposited on trailing edge 306 of substrate 302. Next, transducing element 314 is deposited in layers on base coat 320 to form a write element and a read element. The deposited layers include lower shield 322, shared pole 324, top pole 326, and back via 328. Back via 328 completes a write magnetic circuit through the center of a conductive coil 330 and through pole tips 332 and 334. During writing, conductive coil 330 is energized and induces a magnetic flux. The energized conductive coil 330 causes shared pole 324, top pole 326, and back via 328 to thermally expand such that pole tips 332 and 334 protrude towards the storage medium resulting in an efficient write process.

Typically, an insulating layer 336 fills the space around lower shield 322, shared pole 324, and coil 330. A read sensor 338 is formed in a thin layer between lower shield 322 and shared pole 324. Read sensor 338 is typically a magnetoresistive (MR) or giant magnetoresistive (GMR) sensor.

Referring back to FIG. 9, slider 300 also includes external surfaces or air bearing surfaces. These external surfaces allow slider 300 to lift and "fly" over a medium. For example, slider 300 includes a first external surface or main air bearing surface 316 located along the bottom side of slider substrate 302. First external surface 316 generates a lift such that slider 300 flies over the medium at a distance. Slider 300 also includes second external surface 312. Although FIG. 9 illustrates a single second external surface 312, it should be noted that slider 300 can include any number of second external surfaces.

To form second external surface 312, a heating element 342 is positioned proximate second external surface 312 and formed within thin film structure 308. It should be noted that heating element 342 is not limited to being formed in thin film structure 308. Heating element 342 can be formed in other portions of slider 300. Heating element 342 is deposited in a layer parallel to transducing element 314. Since heating element 342 is deposited in a separate layer spaced apart from transducing element 314, heating element 342 does not significantly effect the temperature of read sensor 338. However, in some embodiments and as shown in FIG. 10, thin film structure 308 can include an insulating material 348 formed in thin film structure 308 and between transducing element 314 and heating element 342. As illustrated, insulating material 348 is deposited on transducing element 314 prior to depositing heating element 342. Insulating material 348 can be made of alumina ($Al_2O_3$) or other materials that demonstrate insulating properties.

Finally, an overcoat layer 340 is deposited with the heating element 342. After slider 300 is formed, it is lapped and ion milled to shape the air bearing surfaces, such as first external surface 316 and second external surface 312. Lapped first external surface 316 will generate a lift such that slider 300 flies over the medium and transducing element 314 communicates with the medium at a distance. Lapped second external surface 312 alters the lift generated by first external surface 316 and, therefore, alters the distance at which transducing element 314 communicates with the medium upon energizing heating element 342. During the process of lapping, first external surface 316, substrate 302, and layers 320, 322, 324, 326, 338 and 340 are eroded at different rates due to their different mechanical and chemical properties. For example, layers 320 and 340, typically made of $Al_2O_3$, are eroded more than substrate 302. Even though not illustrated in FIG. 10, layers 320 and 340 are recessed with respect to the lapped main air bearing surface 316 of substrate 302. Metallic magnetic layers 322, 324 and 326, forming transducing element 314, are also recessed with respect to substrate 302. Their recess, however, is typically smaller than that of layers 320 and 340.

Figure 11:
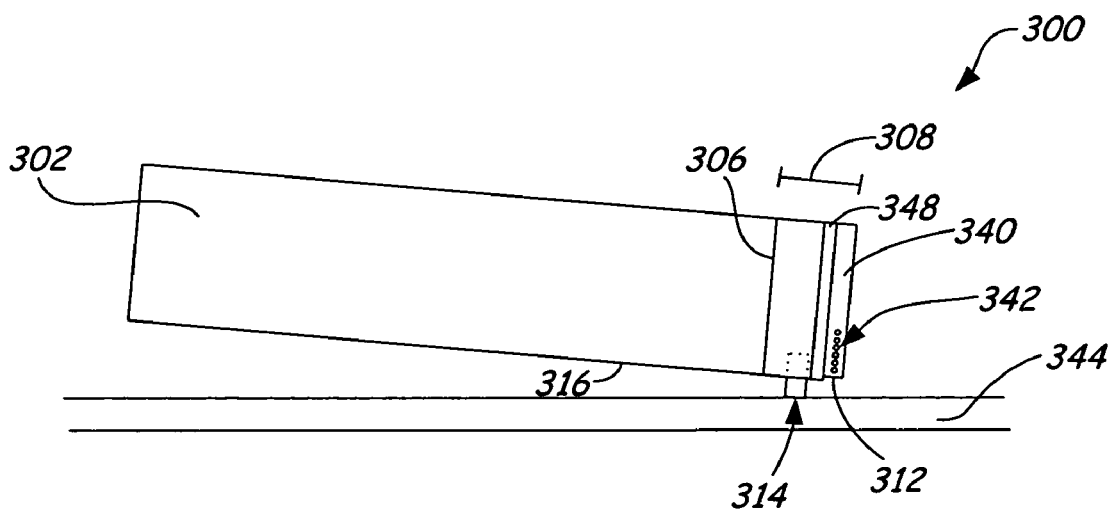
FIG. 11 is a side view of the transducing device illustrated in FIG. 9 in accordance with an embodiment of the present invention.

FIG. 11 illustrates a side view of slider 300 in accordance with an embodiment of the present invention. In FIG. 11, heating element 342 is not energized and the pole tips of magnetic transducer 314 are undesirably in contact with medium 344. Second external surface 312 is formed in thin film structure 308 proximate to and directly covering heating element 342. When heating element 342 is not energized, second external surface 312 is slightly recessed from external surface 316. A recessed second external surface can be formed by energizing heating element 342 during the lapping process or by burnishing during flying.

Figure 12:
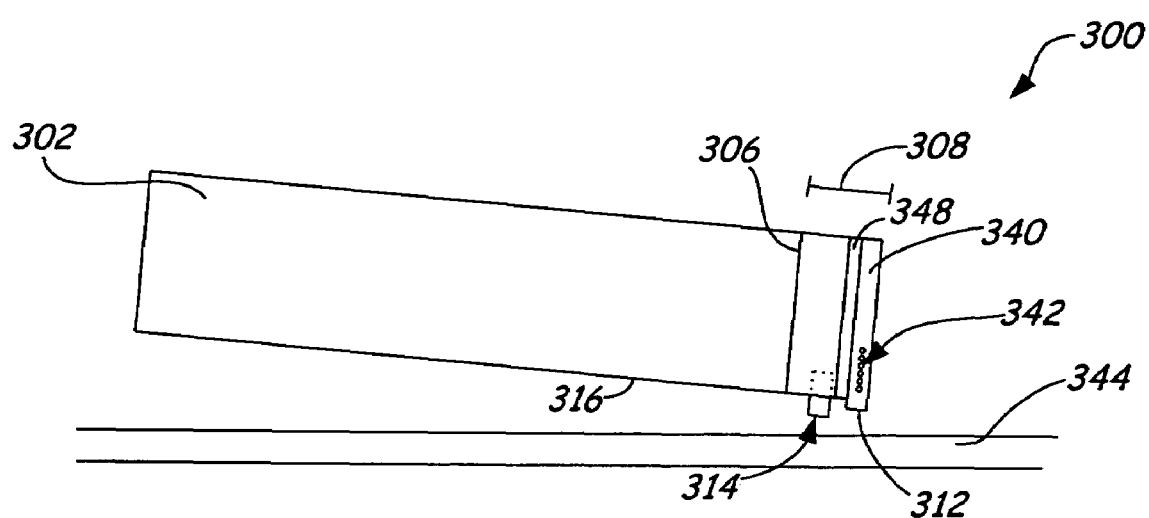
FIG. 12 is a side view of the transducing device illustrated in FIG. 9 in accordance with an embodiment of the present invention.

FIG. 12 illustrates a side view of transducing device or slider 300 in accordance with an embodiment of the present invention. In FIG. 12, heating element 342 is energized. When heating element 342 is energized, second external surface 312 protrudes towards storage medium 344 and alters the lift generated by first external surface 316 such that slider 300 is pushed back from storage medium 344 and transducing element 314 avoids head-to-medium contact.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage system while maintaining substantially the same functionality without departing from the scope and spirit of the present invention. In addition, although the preferred embodiment described herein is directed to a slider, it will be appreciated by those skilled in the art that the teachings of the present invention can be applied to other types of sliders, without departing from the scope and spirit of the present invention.

What is claimed is:

1. A transducing device having a leading edge, a trailing edge and a pair of side edges comprising:
    a transducing element including a write element and a read element;
    at least one heating element formed within the transducing device and located in closer proximity to one of the side edges than the other of the side edges of the transducing device, the at least one heating element spaced apart from the transducing element a sufficient distance to inhibit the at least one heating element from influencing a temperature of the transducing element;
    a first external surface configured to generate a first lift and a second external surface adjacent the first external surface, the second external surface located proximal to the at least one heating element such that the at least one heating element is energized to cause the second external surface to protrude from the first external surface and generate a second lift.

2. The transducing device of claim 1, wherein the second external surface is recessed relative to the first external surface when the at least one heating element is not energized.

3. The transducing device of claim 1 and further comprising an insulating material positioned between the transducing element and the at least one heating element.

4. The transducing device of claim 1, and further comprising at least one trench formed between the transducing element and the at least one heating element.

5. The transducing device of claim 1, wherein the at least one heating element is energized with an electrical current.

6. A transducing device comprising:
    a thin film structure deposited in layers on a substrate, the substrate having a leading edge, trailing edge and a pair of side edges;
    a transducing element including a read element and a write element formed in one of the layers of the thin film structure;
    at least one heating element formed in the thin film structure and spaced apart from the transducing element by a sufficient distance to inhibit the at least one heating element from influencing a temperature of the transducing element, the at least one heating element located in closer proximity to one of the side edges than the other of the side edges; and a first external surface that generates a first lift and a second external surface immediately adjacent to the first external surface, the at least one heating element positioned proximate the second external surface such that the at least one heating element increases in temperature to cause the second external surface to protrude relative to the first external surface.

7. The transducing device of claim 6, wherein the layer of the thin film structure that includes the transducing element also includes the at least one heating element.

8. A transducing device comprising:
a substrate having a leading edge, a trailing edge and a pair of side edges;
a thin film structure formed adjacent the trailing edge in a plurality of layers;
a transducing element formed in the thin film structure and including a read element and a write element;
at least one heating element formed in the thin film structure located in closer proximity to one of the side edges than the other of the side edges and spaced apart from the transducing element a sufficient distance to inhibit the at least one heating element from influencing a temperature of the transducing element; and
a first external surface that generates a first lift and a second external surface, the at least one heating element positioned proximate the second external surface such that when the at least one heating element is not energized the second external surface is recessed from the first external surface and when the at least one heating element is energized the second external surface protrudes from the first external surface and generates a second lift.

9. The transducing device of claim 1, wherein one of the plurality of layers of the thin film structure includes the transducing element and the at least one heating element.

10. The transducing device of claim 1 and further comprising an insulating material positioned between the transducing element and the at least one heating element.

11. The transducing device of claim 1, wherein the at least one heating element is spaced greater than about 5 microns from the transducing element.

12. The transducing device of claim 11, wherein the at least one heating element is spaced between about 10 microns to about 20 microns from the transducing element.

13. The transducing element of claim 1, further comprising at least one trench formed between the transducing element and the at least one heating element.

14. The transducing element of claim 13, wherein the at least one trench has a depth greater than about 2 microns.

15. The transducing element of claim 14, wherein the at least one trench has a depth between about 3 microns and about 10 microns.

16. The transducing element of claim 1, wherein the at least one heating element comprises a conductive coil.

* * * * *